Patented May 21, 1929.

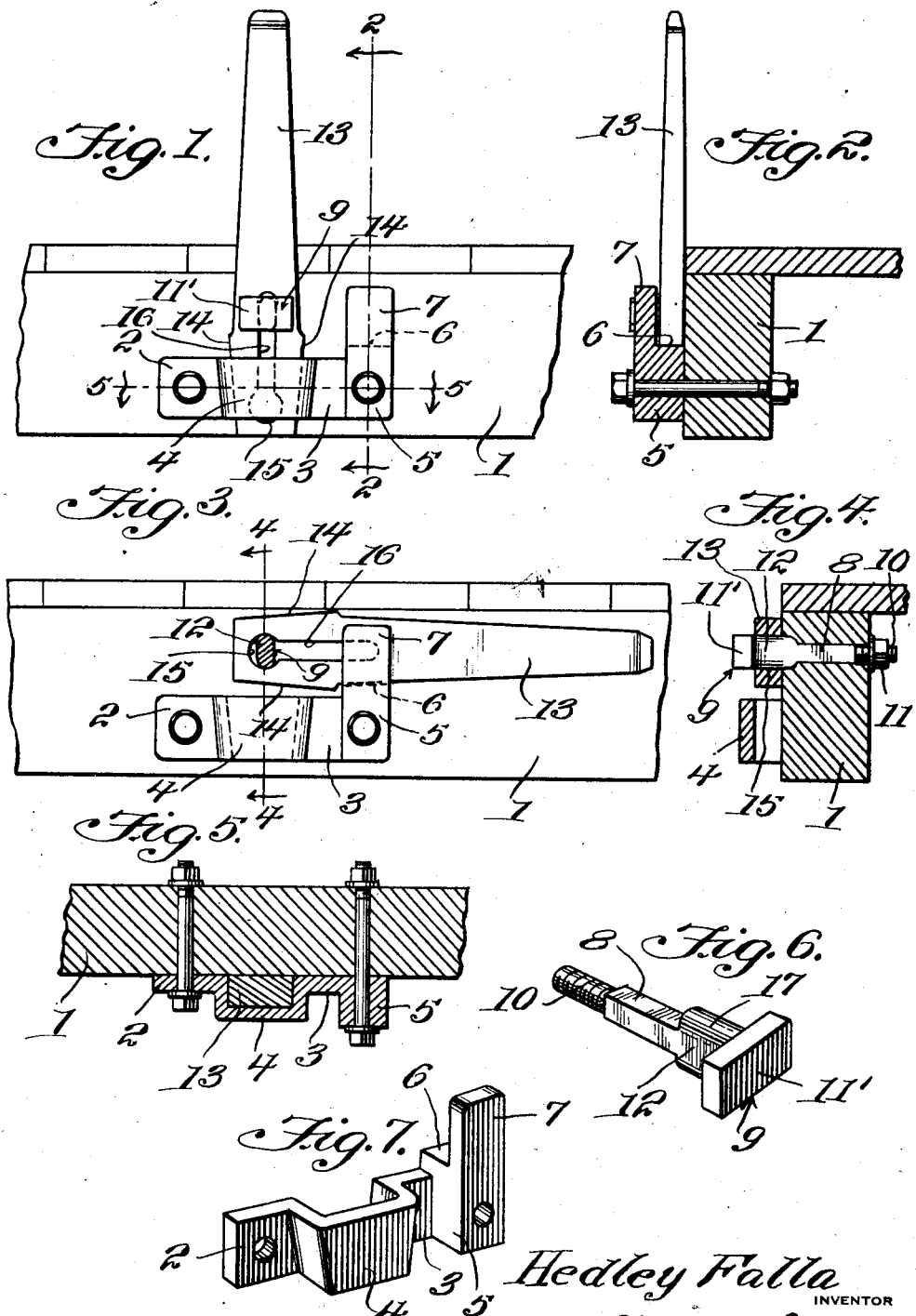

1,714,357

UNITED STATES PATENT OFFICE.

HEDLEY FALLA, OF MILFORD, NEW HAMPSHIRE.

STAKE ATTACHMENT FOR FREIGHT CARS.

Application filed March 31, 1928. Serial No. 266,290.

My present invention has reference to new and novel improvements in car stakes and the primary object is the provision of simple and strong and effective means for sustaining a car stake in upright or operative position and likewise supporting and sustaining the stake against movement when swung along the side of the car.

To the attainment of the foregoing the invention resides in the improvement as hereinafter described and definitely claimed.

In the drawings:

Figure 1 is a side elevation of my improvement.

Figure 2 is a sectional view approximately on the line 2—2 of Figure 1.

Figure 3 is a view substantially similar to Fig. 1 but showing the stake swung along the side of a car body, the T-bolt being in section.

Figure 4 is a sectional view approximately on the line 4—4 of Figure 3.

Figure 5 is a sectional view approximately on the line 5—5 of Figure 1.

Figure 6 is a perspective view of the T-bolt.

Figure 7 is a similar view of the socket member.

It will be noted as the description progresses that the stake is designed to be permanently retained on the side of the car body and that when the same is swung to like parallel to the side of the body the said stake is held from movement in any direction and is effectively supported so that the possibility of the breaking thereof is avoided. It should here be stated that while the improvement is primarily designed for employment in connection with the bodies of railway cars, the same is susceptible for use in connection with motor trucks, wagons or the like. Referring now to the drawings in detail, the numeral 1 indicates one side of an open car body. On the side of the body I secure by bolts, rivets or the like, the oppositely directed inner plates 2 and 3 of socket members 4. The side walls provided by the socket are beveled or inclined inwardly from the top to the bottom portions thereof, so that the sockets are substantially wedge shaped. The plate 3, at its outer edge is thickened outwardly by forming the same with a lug 5. The lug also projects a suitable distance above the upper edge of the socket, affording a shoulder 6, and outward of the shoulder the said lug 5 is formed with an upstanding portion or ear 7.

Let through the side 1 of the car body, in a line with the center of the socket 4 there is the squared shank portion 8 of a T-bolt 9. Outward of the squared portion 8 the shank is formed with a threaded extension 10 and on this extension there is screwed a nut 11 that contacts with the inner face of the side member 1. The head of the T-bolt is of substantially rectangular formation and is indicated by the numeral 11' and the shank at its juncture with the head and outward of the said squared portion 8 is widened, as at 12, and the corners of the said widened portion are rounded. The widened portion provides the T-bolt with what may be termed a lug.

The stake is indicated by the numeral 13. The stake, at its lower end, has its edges inclined or beveled, as at 14, for snug contact with the walls provided by the socket 4. The stake from its said wedge-shaped end is provided with a key-hole slot, the wider passage of which is indicated for distinction by the numeral 15 and the narrow and elongated passage by the numeral 16. The lug portion 12 of the T-bolt 9 is arranged vertically with respect to the longitudinal plane of the car body 1, and the passage 15 is of a size to permit of the stake being swung over the lug, to rest on the shoulder 6 and to be contacted by the ear 7 of the socket member 4 when the stake is not desired for use. The contacting engagement of the rounded edges 17 of the lug 12 of the T-bolt 9 with the walls provided by the passage 15 in the stake will hold the said stake from longitudinal movement, and these contacting surfaces exert a sufficient frictional engagement with each other to prevent the outward swinging of the stake. Such movement is also resisted by the frictional contact of the ear 7 with the stake. By simply swinging the stake to vertical position the lug 12 will be received in the elongated passage 16 of the key hole slot, permitting the stake to have its wedge-shaped end drop into and frictionally engage with the walls of the wedge-shaped socket 4, thereby retaining the stake in its vertical and active position.

The simplicity of the improvement and the advantages thereof will, it is thought, be perfectly apparent to those skilled in the art when the foregoing description has been carefully read in connection with the accompanying drawings. Obviously I do not wish to be restricted to the precise details herein set forth, and, therefore, hold myself entitled to make such changes therefrom as fairly fall within the scope of what I claim.

Having described the invention, I claim:

1. The combination of a car body, a socket fixed on the side thereof, having a laterally extending shoulder and a finger projecting from the shoulder, a headed member having an inner substantially rectangular lug fixed to the car body above and in a line with the center of the socket and a stake having a key hole slot to receive therethrough the lug of the headed member, for the purpose set forth.

2. The combination of a car body, a socket fixed on the side thereof and having its side walls inclined toward each other, said socket having a thickened portion affording a shoulder at one side disposed slightly above the socket, and an upstanding finger projecting from the shoulder, a headed member having an inner substantially rectangular lug fixed to the car body above and in a line with the center of the socket and a stake having a wedge end provided with a longitudinally extending key hole slot that receives therethrough the lug of the headed member, for the purpose set forth.

3. The combination of a car body, a wedge socket having inner oppositely extending plates which are fixed on the side of the car body, one of said plates having its end thickened outwardly and extended outwardly to provide a horizontal straight shoulder, and being formed with an extension providing an ear which is arranged outwardly of the said shoulder, a T-bolt having a portion of its threaded shank squared and received through a squared opening in the car body above and in a line with the axial center of the socket, a nut engaging said bolt, said bolt, inward of its head having its shank portion widened to provide a substantially rectangular lug whose corners are rounded and a stake having a wedge end and provided with a longitudinally extending key hole slot that receives therethrough the lug portion of the T-bolt, for the purpose set forth.

4. A holder for a stake having a key hole opening, comprising a T-bolt having a rectangular lug integrally formed with the shank thereof, adjacent to the head of the bolt.

In testimony whereof I affix my signature.

HEDLEY FALLA.